US012301419B2

(12) United States Patent
Fu et al.

(10) Patent No.: US 12,301,419 B2
(45) Date of Patent: May 13, 2025

(54) METHOD AND APPARATUS FOR MANAGEMENT OF A NETWORK CONFIGURATION SESSION (71) Applicant: ARRIS ENTERPRISES LLC, Suwanee, GA (US)

(72) Inventors: Leon Fu, Shenzhen (CN); Zion Zheng, Shenzhen (CN)

(73) Assignee: ARRIS Enterprises LLC, Horsham, PA (US)

( * ) Notice: Subject to any disclaimer, the term of this patent is extended or adjusted under 35 U.S.C. 154(b) by 11 days.

(21) Appl. No.: 18/030,539

(22) PCT Filed: Oct. 8, 2020

(86) PCT No.: PCT/CN2020/119872
§ 371 (c)(1),
(2) Date: Apr. 6, 2023

(87) PCT Pub. No.: WO2022/073166
PCT Pub. Date: Apr. 14, 2022

(65) Prior Publication Data
US 2023/0379216 A1 Nov. 23, 2023

(51) Int. Cl.
H04L 41/0826 (2022.01)
H04L 41/0806 (2022.01)

(52) U.S. Cl.
CPC ...... *H04L 41/0826* (2013.01); *H04L 41/0806* (2013.01)

(58) Field of Classification Search
CPC .................. H04L 41/0826; H04L 41/0806
See application file for complete search history.

(56) References Cited

U.S. PATENT DOCUMENTS

2007/0169087 A1 7/2007 Fadell
2008/0201480 A1 8/2008 He et al.
(Continued)

FOREIGN PATENT DOCUMENTS

CN 103686940 A 3/2014
CN 106028469 A 10/2016
(Continued)

OTHER PUBLICATIONS

International Search Report and The Written Opinion of the International Searching Authority, dated Jun. 24, 2021, issued in International Application No. PCT/CN2020/119872, 9 pps.

*Primary Examiner* — Viet D Vu
(74) *Attorney, Agent, or Firm* — Panitch Schwarze Belisario & Nadel LLC (57) ABSTRACT The present disclosure provides a description of systems and methods for providing guidance to adjust settings of a router. A mobile device receives user input to aid in establishing a connection between a media storage device and a media player device via a network. The media storage device and the media player device are unable to discover one another via the network. The mobile device transmits, to a router providing the network, a request for current settings information of the router. In response, the mobile device receives, from the router, the current settings information of the router. The mobile device determines, from the current settings information of the router, whether one or more settings are preventing the media storage device and the media player device from discovering one another via the network. The mobile device then generates a window providing options for guidance to change settings of the router.

18 Claims, 5 Drawing Sheets (56) References Cited

U.S. PATENT DOCUMENTS

2010/0277597 A1\* 11/2010 Vaysburg ............... H04N 5/765
                                                          348/231.2
2016/0330673 A1\* 11/2016 Vigoureux ............ H04W 48/16
2016/0337945 A1\* 11/2016 Watt ....................... H04W 48/16
2018/0241628 A1\* 8/2018 Hosoda ............... H04L 41/0816
2023/0254177 A1\* 8/2023 Yan ....................... H04M 15/00
                                                          370/254

FOREIGN PATENT DOCUMENTS

| CN | 109923883 A | 6/2019 |
| CN | 110149679 A | 8/2019 |

\* cited by examiner

METHOD AND APPARATUS FOR MANAGEMENT OF A NETWORK CONFIGURATION SESSION

TECHNICAL FIELD

The present disclosure generally relates to a system and method for guiding users to disable isolation features of a router.

BACKGROUND

Frequently, people wish to play a media file on one particular media player where the media file is stored on a remote media storage device separate from the media player. As an example, a person may wish to use a television to play (e.g., stream) a movie that is stored on a personal computer. Given that the media player and the media storage device are likely manufactured by different manufacturers and have different operating systems, guidelines have been created to facilitate interoperability of media devices for sharing media. An example of such guidelines is the digital living network alliance (DLNA) guidelines. In order to share media between media devices using DLNA, the media devices need to be able to communicate with one another. Such communication features are often provided through the use of a router (e.g., a Wi-Fi router) that provides a wireless network to which the media devices are connected.

One common issues is that it is difficult for most people to easily setup media sharing among their media devices, even when each of the devices is connected to their home network. As a result, help centers of Internet providers are being inundated with calls from people to obtain guidance on how to properly perform the setup for sharing media. This leads to a poor utilization of service provider resources as well as results in a poor consumer experience.

To this end, there is an ever-present need to provide a better user experience while optimizing resource utilization.

SUMMARY

In accordance with illustrative embodiments, a system and method for guiding users to disable isolation features of a router.

In one or more arrangements, a mobile device may receive user input to aid in establishing a connection between a media storage device and a media player device via a network. The media storage device and the media player device are unable to discover one another via the network. The mobile device may transmit, to a router providing the network, a request for current settings information of the router. In response, the mobile device may receive, from the router, the current settings information of the router. The mobile device may determine, from the current settings information of the router, whether one or more settings are preventing the media storage device and the media player device from discovering one another via the network. The mobile device may then generate a window providing options for guidance to change the one or more settings to permit the media storage device and the media player device to discover one another via the network.

A computing device may include a processor and a memory storing instructions that, when executed by the processor, causes the computing device to perform the above-described method.

A system may include a computing device configured to perform the above-described method.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

System for Guiding a User to Manage Media Devices for Media Sharing

Figure 1:
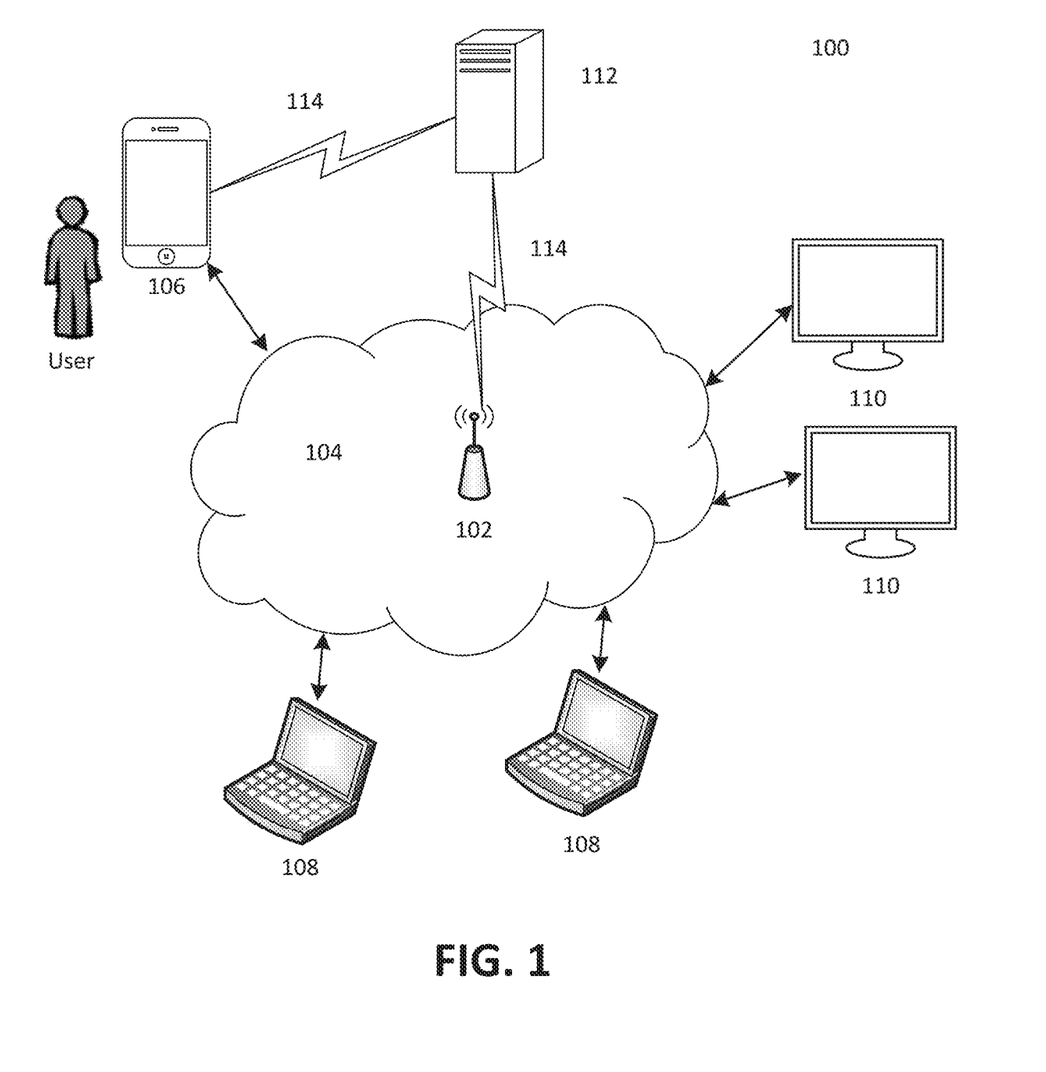
FIG. 1 depicts a block diagram of a high-level system architecture for guiding a user to manage media devices for media sharing in accordance with illustrative embodiments.

FIG. 1 depicts a block diagram of a high-level system architecture for guiding a user to manage media devices for media sharing. The architecture may be embodied in a system 100, which includes a router 102, a mobile device 106, one or more media storage devices 108, one or more media player devices 110, a media sharing management server 112, a network 104 provided by the router 102, and one or more additional networks 114.

The router 102 may be responsible for enabling communications between devices connected to the router's network 104 and other devices connected to the router's network 104. The router 102 may also be responsible for enabling communications between devices connected to the router's network 104 and devices connected to the Internet. These communications may also involve the use of a modem (now shown) communicatively connected to the router 102. The router 102 may be a computing device such as a computing device 500 described below in connection with FIG. 5. For instance, the router 102 may include a processor, memory, transceiver, etc. The router 102 may include one or more radios to provide a wireless radio signal to form the wireless network 104 (e.g., a Wi-Fi network). The router 104 may be configured to use a service set identifier (SSID) as the name of the network 104, which enables other devices (e.g., mobile device 106, media storage device 108, media player device 110) to identify network 104.

The router 102 may be configured with various user-editable settings, which may be set to default settings. Settings may include, for example, network name, network password, channel or frequency band, internet protocol (IP) address, WI-FI isolation settings, SSID isolation settings, isolation whitelists, etc.

A WI-FI isolation setting is a setting responsible for determining whether the router enables or prevents a device connected to the router's network 104 from accessing resources stored by another device connected to the router's network 104. The WI-FI isolation setting may be enabled or disabled. When the WI-FI isolation setting is disabled, the router 102 may permit a device connected to the router's network 104 (e.g., media player device 110) to discover and access resources provided by another device connected to the router's network 104 (e.g., media storage device 108), unless another router setting prevents such access (e.g., SSID isolation enabled). When the WI-FI isolation setting is enabled, the router 102 may prevent a device connected to the router's network 104 (e.g., media player device 110) from discovering and accessing resources provided by another device connected to the router's network 104 (e.g., media storage device 108). The prevention may cause both devices from discovering one another.

An SSID isolation setting is another setting responsible for determining whether the router enables or prevents a device connected to the router's network 104 from accessing resources stored by another device connected to the router's network 104. The SSID isolation setting may be enabled or disabled. When the SSID isolation setting is disabled, the router 102 may permit a device connected to the router's network 104 (e.g., media player device 110) to discover and access resources provided by another device connected to the router's network 104 (e.g., media storage device 108), unless another router setting prevents such access (e.g., WI-FI isolation enabled). When the SSID isolation setting is enabled, the router 102 may prevent a device connected to the router's network 104 (e.g., media player device 110) from discovering and accessing resources provided by another device connected to the router's network 104 (e.g., media storage device 108) if the two devices are connected to the router 102 using different SSIDs (even if they are on the same network 104). The prevention may cause both devices from discovering one another.

The router 102 may include a setting for an isolation whitelist. This setting allows a user to manually enter devices connected to the network 104 that may be connected to other devices connected to the network 104. The whitelist may include the media access control (MAC) address of the device and a custom name of the device (e.g., "television in living room"). Devices on the whitelist may be discoverable and accessible for resources by other devices connected to the router 102, even if WI-FI or SSID isolation features are enabled. As a result, devices on the whitelist do not trigger either a domain name system (DNS) hijack or a user guide to disable SSID isolation. Devices not on the whitelist might not be discoverable or accessible by other devices connected to the router 102 if WI-FI and/or SSID isolation settings is/are enabled. Each of the devices described herein may include a unique MAC address.

A mobile device 106 may be responsible for providing guidance to a user to manage media devices for media sharing. The mobile device 106 may be a computing device such as computing device 500 described below in connection with FIG. 5. For instance, the mobile device 106 may include a processor, memory, transceiver, etc. Examples of a mobile device 106 include a smartphone, tablet, laptop, personal computer, etc. The mobile device 106 may be a personal device of its user, which desires to stream media from a media storage device 108 to a media player device 110 for playback on the media player device 110. The mobile device 106 may be configured to join network 104 and wirelessly communicate with this network (e.g., a WI-FI network) using an SSID of the network 104. As a result, the mobile device 106 may be configured to communicate with the router 102 as well as other devices connected to network 104 pursuant to any isolation settings and/or whitelist settings. The mobile device 106 may be configured to communicate with devices not connected to the network 106 via a different network 114 (e.g., a cellular network, a satellite network, etc.).

The mobile device 106 may aid the user in setting up media sharing among various media devices connected to the router's network 104. For instance, the user may desire to play a movie stored on a media storage device 108 at a media player device 110. The user may attempt to establish a communication connection between the media storage device 108 and the media player device 110, both of which may be connected to network 104. However, the user may be unable to establish such a communication connection and, therefore, unable to play the movie at the media player device 110. The inability to play the movie at the media player device 110 may be the result of a router setting (e.g., WI-FI isolation enabled, SSID isolation enabled, devices not on a whitelist, etc.). In such a case, the media player device 110 may not be able to discover the media storage device 108, and vice versa.

The mobile device 106 may be configured to detect the current settings of the router 102. For instance, the mobile device 106 may be able to transmit, to the router 102, a request for its current settings. The request may include a request for the WI-FI isolation setting, the SSID isolation setting, and any whitelist settings. In response, the mobile device 106 may receive such setting information, determine changes to the router settings that facilitate sharing of media between user-selected devices, and guide the user to change the settings. As a result, the user may be able to establish such a communication connection between the media storage device 108 and the media player device 110 such that the media player device is able to play the movie. In some cases, the mobile device 106 may utilize an installed mobile app (e.g., software application) downloaded from an application store. The mobile app may be executed by the mobile device 106 to cause the mobile device 106 to perform one or more of the functions of the mobile device 106 discussed herein. For example, the mobile app may cause the mobile device 106 to send the request to the router 102, determine changes to the settings, and output guidance to the user. In some cases, the mobile device 106 may utilize a web browser to perform one of more of the functions of the mobile device 106 discussed herein. For example, the mobile device 106 may, via its web browser, send the request to the router 102, determine changes to the settings, and output guidance to the user.

The one or more media storage devices 108 may be responsible for storing and providing media to other devices. A media storage device 108 may be a computing device such as a computing device 500 described below in connection with FIG. 5. For instance, the media storage device 108 may include a processor, memory, transceiver, etc. The media storage device 108 may store one or more media including, for example, videos (e.g., movies, shows), music (e.g., song recordings), pictures, documents, and the like. The media storage device 108 may be communicatively connected to the network 104. Depending on the router's setting, the media storage device 108 may be able to communicate with one or more other devices connected to the network 104 (e.g., mobile device 106, other media storage devices 108, and media player devices 110). The media storage device 108 may be configured to support DLNA to permit sharing (e.g., streaming) of its stored media to other devices. Examples of a media storage device 108 include a set-top box, television, personal computer, laptop, server, tablet, smartphone, network storage, mobile device 106, media player device 110, etc.

The one or more media player devices 110 may be responsible for outputting media to the user (e.g., audible and visual output). A media player device 110 may be a computing device such as a computing device 500 described below in connection with FIG. 5. For instance, the media player device 110 may include a processor, memory, transceiver, etc. The media player device 110 may output (e.g., play, display, etc.) one or more media including, for example, videos (e.g., movies, shows), music (e.g., song recordings), pictures, documents, and the like. The media player device 110 may be communicatively connected to the network 104. Depending on the router's setting, the media player device 110 may be able to communicate with one or more other devices connected to the network 104 (e.g., mobile device 106, other media player devices 110, and media storage devices 108). The media player device 110 may be configured to support DLNA to permit sharing (e.g., streaming) of media stored at other devices. Examples of a media player device 110 include a set-top box, a television, personal computer, laptop, server, tablet, smartphone, mobile device 106, etc.

A media sharing management server 112 may be responsible for providing guidance to a user, via mobile device 106, to manage media devices for media sharing. The media sharing management server 112 may be a computing device such as computing device 500 described below in connection with FIG. 5. For instance, the media sharing management server 112 may include a processor, memory, transceiver, etc. The media sharing management server 112 may be configured to communicate with the mobile device 106 over one or more wired and/or wireless networks 114 (e.g., fiber-optic network, coax network, hybrid network, cellular network, satellite network, etc.). In some instances, the media sharing server 112 may be configured to communicate with the router 102 over one or more wired and/or wireless networks 114 (e.g., fiber-optic network, coax network, hybrid network, cellular network, satellite network, etc.).

Figure 3:
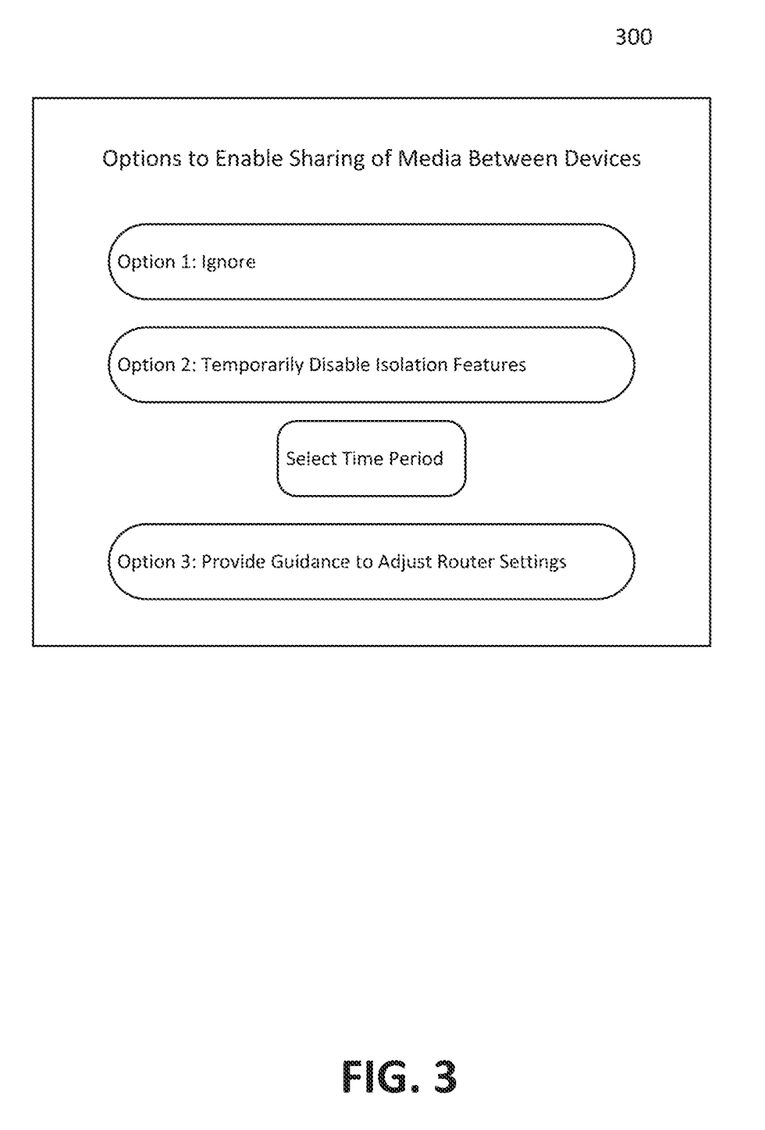
FIG. 3 depicts a graphical interface in accordance with illustrative embodiments.

While functions discussed herein may be described as being performed by the mobile device 106, in some implementations, one or more of these functions may be performed remotely by the media sharing management server 112. As an example, the mobile device 106 may request settings information from the router 102 and transmit the received settings information to the media sharing management server 112. The media sharing management server 112 may determine any changes to the settings and transmit corresponding guidance to the mobile device 106 (e.g., via an instruction to generate a pop up message, an electronic mail message or text message for view by the user). As another example, the mobile device 106 may transmit a request for guidance to the media sharing management server 112. In response, the media sharing management server 112 may transmit a request for settings information to the router 102. Based on the settings information received from the router 102, the media sharing management server 112 may determine any changes to the settings and transmit corresponding guidance to the mobile device 106 (e.g., via an instruction to generate a pop up message, an electronic mail message or text message for view by the user). In some cases, the media sharing management server 112 may also receive and account for a user input selection of guidance options as described below in step 212 and FIG. 3. The user input selection may be input into the mobile device 106, which, in turn, sends the selection to the media sharing management server 112.

Methods for Guiding a User to Manage Media Devices for Media Sharing

Figure 2:
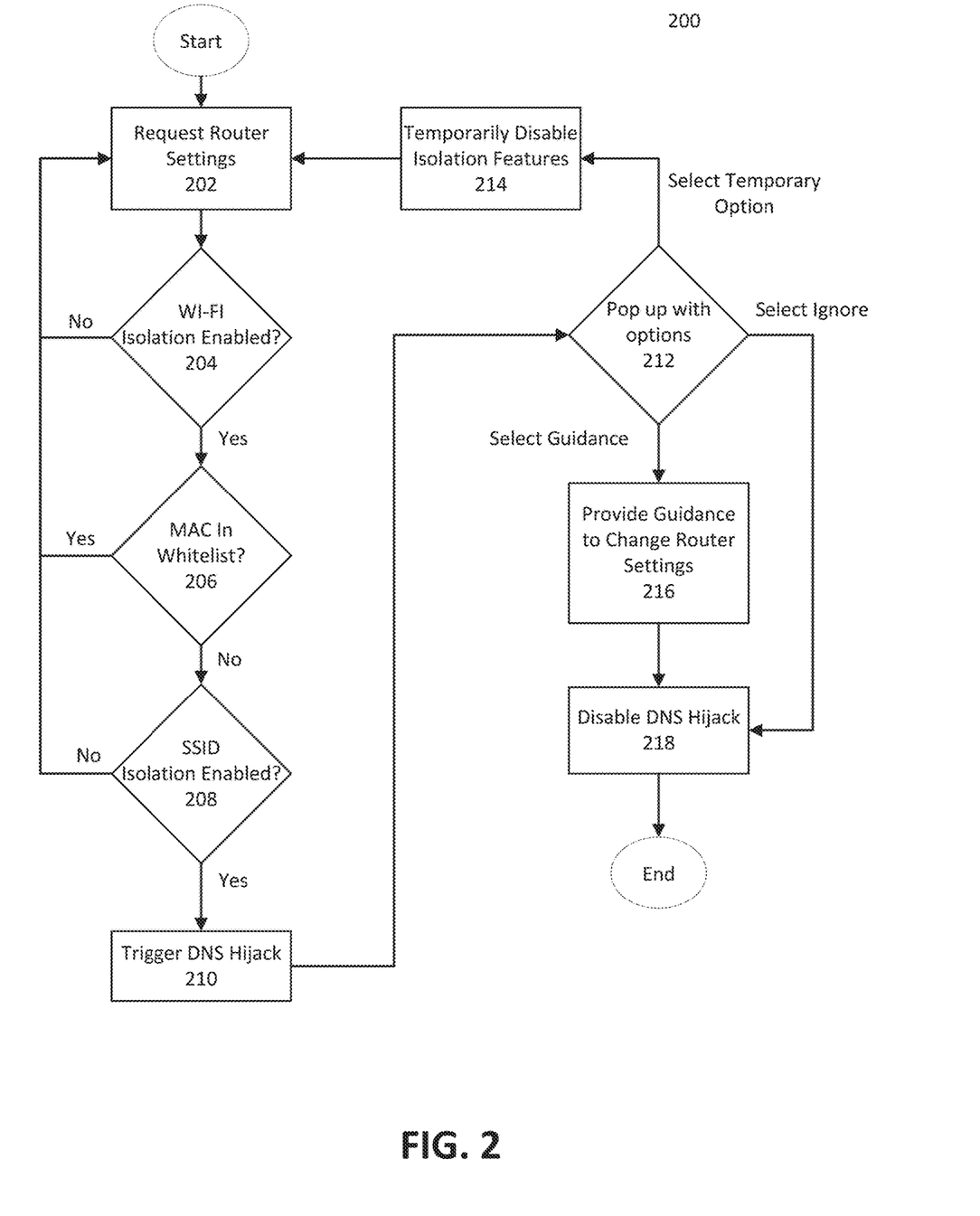
FIG. 2 depicts a flow diagram illustrating a process for guiding a user to manage media devices for media sharing in accordance with illustrative embodiments.

FIG. 2 depicts a flow diagram illustrating a method 200 for guiding a user to manage media devices for media sharing in accordance with illustrative embodiments. The method 200 may be embodied in one or more executable instructions that, when executed, cause the mobile device 106 to perform the steps of the method 200. Prior to the steps of method 200, the user may have attempted to establish a communication connection between a particular media storage device 108 and a particular media player device 110, both of which may be connected to network 104. However, the user may be unable to establish such a communication connection and, therefore, unable to play a movie at the particular media player device 110. The inability to play the movie at the particular media player device 110 may be the result of a router setting (e.g., WI-FI isolation enabled, SSID isolation enabled, devices not on a whitelist, etc.). In such a case, the particular media player device 110 may not be able to discover the particular media storage device 108, and vice versa.

In order to obtain help in setting up a connection between the particular media storage device 108 and the particular media player device 110, the user may open a mobile app installed on the mobile device 106 to select an option to obtain help to establish a connection between devices. The mobile device 106 may request the user to enter the MAC addresses of the devices the user wishes to establish a connection there between. The mobile device 106 may provide the user guidance on how to lookup the MAC address based on the device's type (e.g., computer, television, tablet, smartphone, etc.). As an example, the mobile device 106 may output instructions to the user to toggle to the particular media storage device's 108 or particular media player device's 110 settings screens to obtain the MAC addresses. The MAC addresses server to identify the devices. In some cases, a web browser and a web page provided by the media sharing management server 112 may be used in addition or in place of the mobile app. In such cases, the media sharing management server 112 may, via the web browser, request the user to enter the MAC addresses and/or provide such guidance to obtain the MAC addresses to the user.

The method may begin at step 202, in which the mobile device 106 may transmit, to the router 102, a request for the router's current settings. The request may include a request for the WI-FI isolation setting, the SSID isolation setting, and any whitelist settings. The request may be transmitted over network 104. The request may be made either using the mobile app or a web browser by browsing to the router's administration webpage. Instructions to help guide the user to the router's administration webpage may be displayed to the user via the mobile device 106. As an example, the instructions may instruct the user where to look on the router 102 to determine the router's administration URL (uniform resource locator) that provides the administration webpage.

In order to discover the router 102, the mobile device 106 may use simple service discovery protocol (SSDP), which is a protocol for discovery of network services and presence information. Particularly, the mobile device 106 may issue an M-search command on the network 104 and the router 102 may issue a response such that the mobile device 106 may discover the router 102.

In response to the request, the mobile device 106 may receive such setting information. For instance, the router 102 may transmit, to the mobile device 106, the current setting for WI-FI isolation (e.g., whether it is enabled or disabled), the current setting for SSID isolation (e.g., whether it is enabled or disabled), and any isolation whitelist settings.

At step 204, the mobile device 106 may determine whether the router 102 currently has WI-FI isolation enabled. If WIFI isolation is not enabled, the mobile device 106 may determine that the media storage device 108 and the media player device 110 should be able to discover and communicate with one another. In such an instance, the method may return to the start (e.g., step 202). In some cases, in such an instance, the mobile device 106 may display a pop-up message informing the user that the media storage device 108 and the media player device 110 should be able to discover and communicate with one another.

If WI-FI isolation is enabled, the mobile device 106 may determine that WI-FI isolation may be blocking discovery and communication between the particular media storage device 108 and the particular media player device 110. In such a case, at step 206, the mobile device 106 may determine whether the MAC addresses of the particular media storage device 108 and/or the particular media player device 110 are on the isolation whitelist of MAC addresses. If MAC addresses of both the particular media storage device 108 and the particular media player device 110 are on the isolation whitelist of MAC addresses, then the mobile device 106 may determine that the media storage device 108 and the media player device 110 should be able to discover and communicate with one another. In such an instance, the method may return to the start (e.g., step 202). In such an instance, the user guide to disable SSID will not be triggered, nor will a DNS hijacking. In some cases, in such an instance, the mobile device 106 may display a pop-up message informing the user that the media storage device 108 and the media player device 110 should be able to discover and communicate with one another.

If the MAC address of either the media storage device 108 or the media player device 110 is not on the whitelist of MAC addresses, then the mobile device 106 may determine that the whitelist might not enable communication between the media storage device 108 and the media player device 110. In such a case, at step 208, the mobile device 106 may determine whether SSID isolation is enabled. If SSID isolation is not enabled, then mobile device 106 may determine that the media storage device 108 and the media player device 110 should be able to discover and communicate with one another. In such an instance, the method may return to the start (e.g., step 202). In some cases, in such an instance, the mobile device 106 may display a pop-up message informing the user that the media storage device 108 and the media player device 110 should be able to discover and communicate with one another.

If SSID is enabled, the mobile device 106 may determine that SSID isolation may be blocking discovery and communication between the media storage device 108 and the media player device 110. In such a case, at step 210, the mobile device 106 may trigger a domain name system (DNS) hijack of the router 102. The router 102 may be hijacked to enable the mobile device 106 to take over the router 102 and overwrite its settings. Specifically, if the mobile device 106 executes its web browser, then DNS hijacking will cause a pop up guide to be displayed to the user. The pop up guide will include options to change settings (discussed below at step 212) as well as a field to enter router authentication credentials (username, password, etc.). Correct authentication credentials must be entered in order to permit setting changes. If the mobile device 106 uses an installed mobile app, then the app will display options (discussed below at step 212) to change SSID isolation settings.

At step 212, the mobile computing device 106 may provide a popup window to display user-selectable on-screen options. In one or more arrangements, the window may include three options as depicted in the example window 300 of FIG. 3. The first option may be to ignore the pop up window and guidance. If the user selects this option (e.g., by touching the option on the touchscreen of the mobile device 106), the mobile device 106 may, at step 218, disable the DNS hijack and end the process. In some instance, this option may be to disable future popup windows.

The second option may be to temporarily disable WI-FI and/or SSID isolation features. The second option may include a field for the user to enter a time period that once elapses any temporarily disabled isolation features are re-enabled. Additionally or alternatively, the second option may include a drop down menu of predefined time periods (e.g., 3 hours, 1 day, 1 week, etc.). If a predefined time period is selected, any temporarily disabled isolation features re-enable once the predefined time period elapses. If the user selects this option (e.g., by touching the option on the touchscreen of the mobile device 106), the mobile device 106 may, at step 214, disable any enabled isolation features (e.g., disable WIFI isolation, disable SSID isolation) for the specified time period. For instance, the mobile device 106 may send a command to the router 102 to disable any enabled isolation features for the specified time period. As a result, the mobile device 106 may inform the user that the media storage device 108 and the media player device 110 should be able to discover and communicate with one another. In such an instance, the method may return to the start (e.g., step 202).

The third option may to obtain guidance for changing one or more settings of the router 102. If the user selects this option, the mobile device 106 may, at step 216, determine and/or otherwise obtain appropriate guidance and provide such guidance to the user. The guidance may include one or more instructions for the user to perform in order to change the settings of the router 102 so as to enable discovery and communication between the media storage device 108 and the media player device 110.

The guidance provided may be tailored to the current settings of the router 102. For instance, based on the results of steps 204-208, the mobile device 106 has determined that WI-FI isolation is enabled, SSID isolation is enabled, and that the neither MAC address of the particular media storage device 108 nor the particular media player device 110 are listed on the router's isolation whitelist. As a result, the mobile device 106 determines and/or otherwise obtains guidance based on these specific settings of the router 102. In some cases, the mobile device 106 may locally determine the guidance using the mobile app. In other cases, the mobile device 106 may transmit its determination of the router's settings to the media sharing management server 112 and, in response, receive the guidance from the media sharing management server 112. In such cases, the media sharing management server 112 may transmit the guidance to the mobile device 106 in the form of an electronic mail message addressed to the user's email account or a short messaging service (SMS) text message to the user's phone number corresponding with the mobile device 106. In some cases, the mobile device 106 may, after either determining the guidance itself or receiving the guidance from the media sharing management server 112, generate a popup window that displays such guidance for viewing by the user.

The guidance may include a first set of instructions for the user to disable isolation features including any enabled WI-FI isolation feature and/or any enabled SSID isolation enabled feature. Additionally or alternatively, the guidance may include a second set of instructions for the user to add the MAC addresses of the particular media storage device 108 and the particular media player device 110 to the router's whitelist. The guidance may include an indication that only the first set of instructions or the second set of instruction need to be performed. The guidance may include pros and cons of disabling isolation features versus adding devices to the isolation whitelist, and vice-versa. For instance, a pro of disabling isolation features is that it permits the user to share media between many other media storage/player devices 108/110 in addition to the ones the user is currently trying share media between. However, a con of disabling isolation features is that it reduces overall security of the router 102 thereby enabling other devices to more easily connect to network 104 and establish communication with devices connected thereto. A pro of adding the MAC addresses of the devices the user wishes to share media between to the router's isolation whitelist is that it enables sharing of the media between those devices while preventing other devices from easily accessing the network by maintaining enablement of the isolation features. However, a con of adding the MAC addresses of the devices the user wishes to share media between to the router's isolation whitelist is that it, by itself, does not allow the user to share the media to other devices connected to network 104.

Example of guidance instructions for the user include, for example, a step-by-step guide to disable WI-FI and SSID features. These instructions include instructions to use a web browser to navigate to the administration URL of the router 102, instructions to on which menu items to select, and instructions to disable settings related to the isolation features. The instructions may also indicate where to add the MAC addresses of the media storage device 108 and the media player device 110 to the router's isolation whitelist.

Alternatively, the guidance may include instructions executable by the mobile device 106 such that the mobile device 106 itself adjusts the settings of the router 102, without having the user manually adjust the settings of the router 102. For instance, the mobile device 106 may automatically navigate to the router's administration URL and adjust the settings (e.g., disable isolation features and/or add the MAC addresses to the router's whitelist). Optionally, the mobile device 106 may prompt the user to select whether the user wishes to disable the isolation features and/or add the MAC addresses of the devices to the router's whitelist along with the pros and cons of each. If the user selects to disable the isolation features, the mobile device 106 may instruct the router 102 to disable WI-FI and SSID isolation features. If the user selects to add the MAC address of the devices to the whitelist, the mobile device 106 transmits the MAC addresses to the router along with an instruction to add the MAC addresses to the whitelist, while maintaining enablement of the isolation features. In some cases, the mobile device 106 performs the settings adjustment through the administration webpage of the router 102. At step 218, the mobile device 106 disables the DNS hijack of the router.

Figure 4:
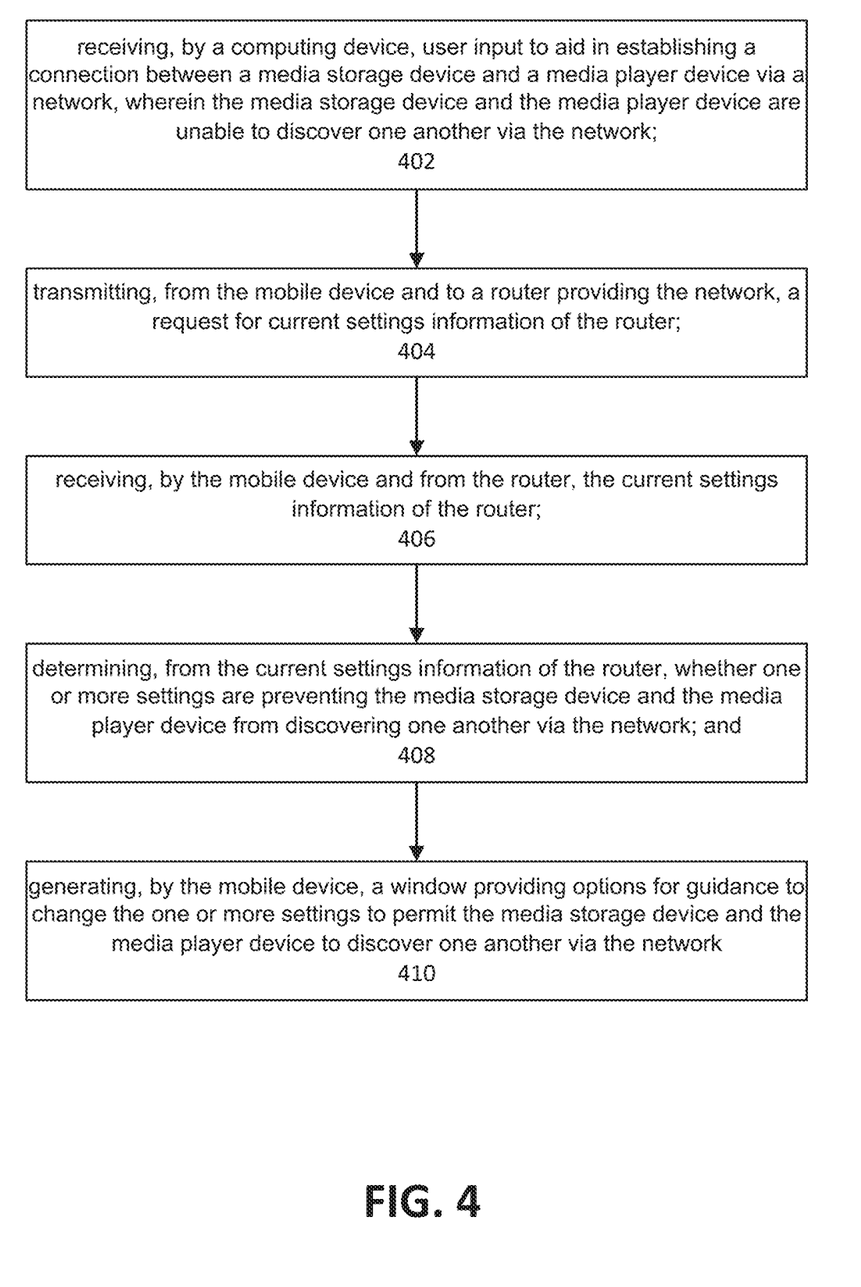
FIG. 4 is another flow in accordance with illustrative embodiments.

FIG. 4 is another flow in accordance with illustrative embodiments. At step 402, a mobile device may receive user input to aid in establishing a connection between a media storage device and a media player device via a network. The media storage device and the media player device are unable to discover one another via the network. At step 404, the mobile device may transmit, to a router providing the network, a request for current settings information of the router. At step 406, the mobile device may receive, from the router, the current settings information of the router. At step 408, the mobile device may determine, from the current settings information of the router, whether one or more settings are preventing the media storage device and the media player device from discovering one another via the network. At step 410, the mobile device may generate a window providing options for guidance to change the one or more settings to permit the media storage device and the media player device to discover one another via the network.

Computer System Architecture

Figure 5:
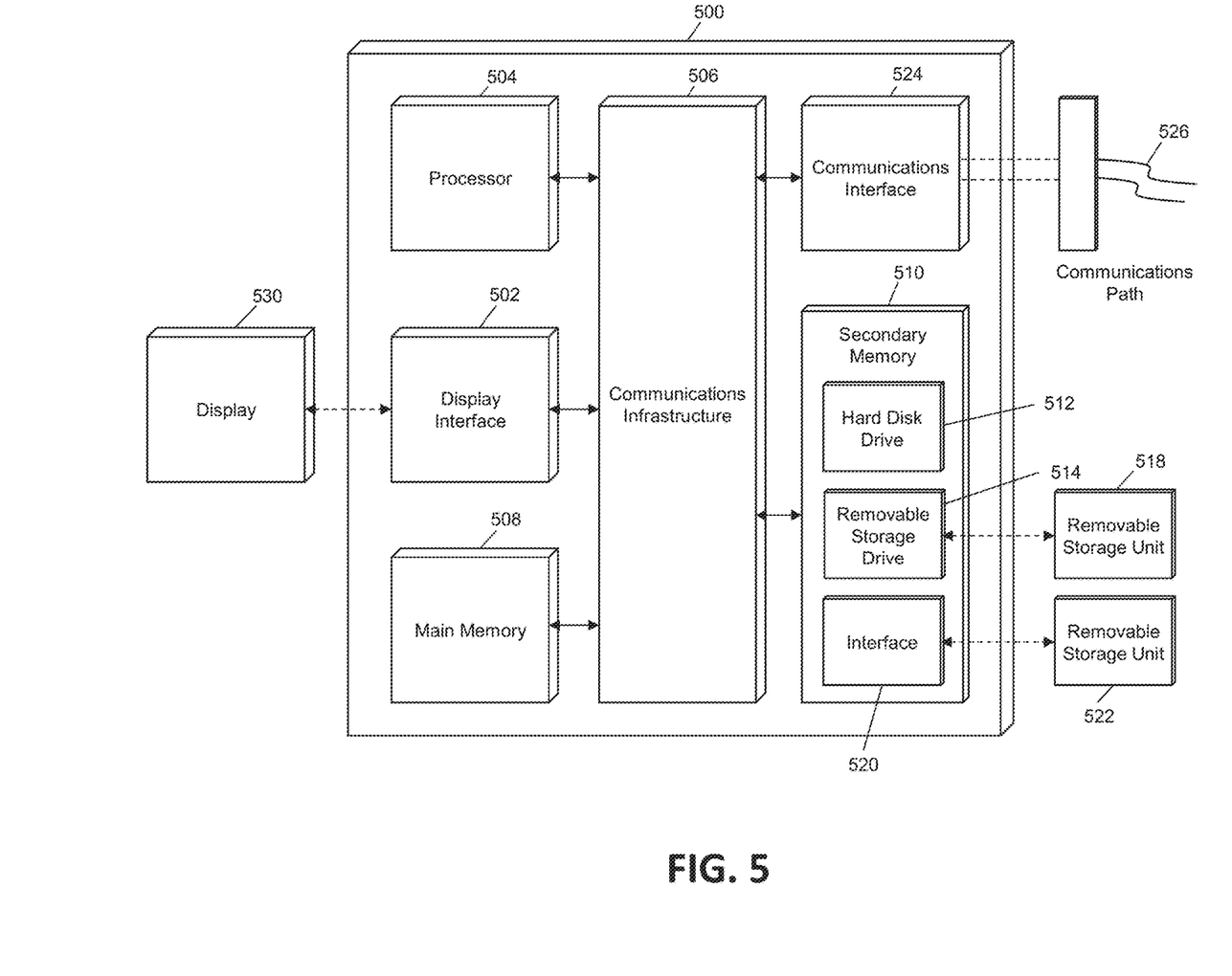
FIG. 5 is a block diagram depicting a computer system architecture in accordance with illustrative embodiments.

FIG. 5 illustrates a representative computer system/device 500 in which embodiments of the present disclosure, or portions thereof, may be implemented as computer-readable code executed on hardware. For example, the router 102, the mobile device 106, the media storage device 108, the media player device 110, and the server 112 of FIG. 1 may be implemented in whole or in part by a computer system 500 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this representative computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 504 may be processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 2 and 4 as discussed herein. Accordingly, such computer programs may represent controllers of the computer system 500. Where the present disclosure is implemented using software executed on hardware, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software executed on hardware, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods guiding users to disable isolation features of a router. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method comprising:
   receiving, by a mobile device, user input to aid in establishing a connection between a media storage device and a media player device via a network, wherein the media storage device and the media player device are each connected to the network, and wherein the media storage device and the media player device are unable to discover one another via the network;
   transmitting, from the mobile device and to a router providing the network, a request for current settings information of the router;
   receiving, by the mobile device and from the router, the current settings information of the router;
   determining, from the current settings information of the router by the mobile device, whether one or more settings are preventing the media storage device and the media player device from discovering one another via the network;
   triggering, by the mobile device, a domain name system hijacking of the router;
   generating, by the mobile device, a window providing options for guidance to change the one or more settings to permit the media storage device and the media player device to discover one another via the network; and
   disabling, by the mobile device, the domain name system hijacking of the router after providing the guidance.

2. The method of claim 1, wherein the one or more settings preventing the media storage device and the media player device from discovering one another via the network comprise:
   a setting for WI-FI isolation being enabled;
   a setting for SSID isolation being enabled; and
   media access control (MAC) addresses of the media storage device and the media player device not being included in an isolation whitelist of MAC addresses.

3. The method of claim 1, wherein the window includes:
   an option to ignore the guidance;
   an option to disable any enabled isolation features of the router for a time period; and
   an option to obtain guidance to change router settings.

4. The method of claim 3, further comprising:
   receiving, by the mobile device, a user input selecting the option to disable any enabled isolation features of the router for the time period; and
   transmitting, by the mobile device and to the router, a command for the router to disable any enabled isolation features of the router for the time period.

5. The method of claim 4, further comprising:
   receiving, by the mobile device, a user input specifying the time period.

6. The method of claim 3, further comprising:
   receiving, by the mobile device, a user input selecting the option to obtain guidance to change router settings;
   transmitting, by the mobile device and to a remote server, a request for guidance, wherein the request comprises an indication of the one or more settings preventing the media storage device and the media player device from discovering one another via the network; and
   receiving, by the mobile device and from the remove server, instructions on how to adjust the one or more settings preventing the media storage device and the media player device from discovering one another via the network.

7. The method of claim 6, wherein the instructions are received in a short messaging service (SMS) text message using a phone number of the mobile device.

8. The method of claim 6, wherein the instructions are received in an electronic mail message associated with a user of the mobile device.

9. The method of claim 6, further comprising:
   displaying, by the mobile device, a pop up window comprising the instructions on how to adjust the one or more settings preventing the media storage device and the media player device from discovering one another via the network.

10. An apparatus, comprising:
    a processor; and
    a memory storing instructions that, when executed by the processor, cause the apparatus to:
    receive user input to aid in establishing a connection between a media storage device and a media player device via a network, wherein the media storage device and the media player device are each connected to the network, and wherein the media storage device and the media player device are unable to discover one another via the network;
    transmit, to a router providing the network, a request for current settings information of the router;
    receive, from the router, the current settings information of the router;
    determine, from the current settings information of the router by the mobile device, whether one or more settings are preventing the media storage device and the media player device from discovering one another via the network;
    trigger a domain name system hijacking of the router;
    generate a window providing options for guidance to change the one or more settings to permit the media storage device and the media player device to discover one another via the network; and
    disable the domain name system hijacking of the router after providing the guidance.

11. The apparatus of claim 10, wherein the one or more settings preventing the media storage device and the media player device from discovering one another via the network comprise:
    a setting for WI-FI isolation being enabled;
    a setting for SSID isolation being enabled; and
    media access control (MAC) addresses of the media storage device and the media player device not being included in an isolation whitelist of MAC addresses.

12. The apparatus of claim 10, wherein the window includes:
    an option to ignore the guidance;
    an option to disable any enabled isolation features of the router for a time period; and
    an option to obtain guidance to change router settings.

13. The apparatus of claim 12, wherein the memory stores further instructions that, when executed by the processor, cause the apparatus to:

receive a user input selecting the option to disable any enabled isolation features of the router for the time period; and transmit, to the router, a command for the router to disable any enabled isolation features of the router for the time period.

14. The apparatus of claim 13, wherein the memory stores further instructions that, when executed by the processor, cause the apparatus to:

receive a user input specifying the time period.

15. The apparatus of claim 12, wherein the memory stores further instructions that, when executed by the processor, cause the apparatus to:

receive a user input selecting the option to obtain guidance to change router settings;

transmit, to a remote server, a request for guidance, wherein the request comprises an indication of the one or more settings preventing the media storage device and the media player device from discovering one another via the network; and receive, from the remove server, instructions on how to adjust the one or more settings preventing the media storage device and the media player device from discovering one another via the network.

16. The apparatus of claim 15, wherein the instructions are received in an short messaging service (SMS) text message using a phone number of the apparatus.

17. The apparatus of claim 15, wherein the instructions are received in an electronic mail message associated with a user of the apparatus.

18. The apparatus of claim 15, wherein the memory stores further instructions that, when executed by the processor, cause the apparatus to:

display a pop up window comprising the instructions on how to adjust the one or more settings preventing the media storage device and the media player device from discovering one another via the network.

* * * * *